United States Patent [19]

Kishima et al.

[11] Patent Number: 4,464,485

[45] Date of Patent: Aug. 7, 1984

[54] METHOD OF PRODUCING POROUS MATERIAL HAVING OPEN PORES

[75] Inventors: Noboru Kishima; Yoshio Ueda; Takeshi Sato, all of Kitakyusyu, Japan

[73] Assignee: Toto, Ltd., Kitakyusyu, Japan

[21] Appl. No.: 569,294

[22] Filed: Jan. 9, 1984

[51] Int. Cl.$^3$ .............................................. C08J 9/28
[52] U.S. Cl. ...................................... 521/64; 521/127; 521/128; 521/178; 528/111.3; 528/123
[58] Field of Search ............................ 528/111.3, 123; 521/127, 128, 178, 64

[56] References Cited

U.S. PATENT DOCUMENTS

| 3,464,854 | 9/1969 | Bloger | 521/178 |
| 3,661,267 | 5/1972 | Markley | 521/178 |
| 3,726,819 | 4/1973 | Dijkhurzen | 521/178 |

Primary Examiner—Morton Foelak
Attorney, Agent, or Firm—Bucknam and Archer

[57] ABSTRACT

Disclosed is a method of producing a porous material having open pores, comprising the steps of preparing a slurry from a mixture comprising a bisphenol-type epoxy resin, a specific mixture amide compound as a hardener, a filler and water, casting the slurry in a water-impermeable mold, hardening the slurry while it contains the water and dehydrating the hardened body.

8 Claims, No Drawings

METHOD OF PRODUCING POROUS MATERIAL HAVING OPEN PORES

BACKGROUND OF THE INVENTION

The present invention relates to a method of producing a porous material having open pores. More particularly, the invention is concerned with a method of producing a porous material having open pores from a raw material which comprises a bisphenol-type epoxy resin, a specific mixture amide compound as a hardener, filler and water.

Hitherto, as measures for producing a porous material having open pores for use as a filtering medium, air diffusion medium, casting mold and so forth, various methods have been produced such as sintering of metal powder, sintering of powdered thermoplastic resin, sintering of inorganic powder, hydration setting of cement or the like, pressing or stamping of a mixture of thermosetting resin and filler, hardening of a resin liquid containing pore-forming agent followed by the removal of the pore-forming agent by dissolving, extraction or evaporation, use of a blowing agent, evaporation of water from water-containing polyester resin, and so forth.

These known methods of producing porous material having open pores, however, encountered one or more of the following problems in connection with the molding process. First of all, it is to be pointed out that these known methods impractically limit or restrict the shape and size of the product. In addition, these methods often require a heat treatment at high temperature, as well as a press work at high pressures. The method which makes use of the pore-forming agent must employ a step of heating or vacuum operation for the removal of the pore-forming agent by evaporation. Furthermore, these known methods are generally complicated and difficult to conduct.

Another problem is that, with these known methods, it is quite difficult to effect the pore size control which is the most important factor when the porous material is used as a filtering medium, air diffusion medium, casting mold or the like due to the following reasons.

In the production of a porous material from metal powder by sintering, it is difficult to obtain a pore size smaller than 5 microns because of a specific relation between the particle size of the metal powder and the surface energy during the sintering. Consequently, it is quite difficult to effect control of the pore size to obtain pores on the order of 1 micron or so. In the case of the sintering of the powder of a ceramic material or resin, the packing density at the time of molding is almost impossible to control although the particle size of the material can be controlled finely. In addition, this method suffers from a large change in the pore structure in the course of the sintering, so that the pore size is distributed over a wide range to hinder the control of the pore size.

Referring now to the pressing and stamping of a solid powder together with a binder such as an adhesive, the control of the pore size is impaired particularly when the product has a complicated shape, for the reasons such as non-uniform packing due to non-uniform application of the molding pressure attributable to the complicated shape of the product, non-uniform mixing of the binder, and so on.

In the case of the hydration hardening of a cement, gypsum, plaster or the like, the difficulty is involved in the control of the nucleation and growth of the crystals of the hydrate, and precise control of the mean pore size to obtain pores on the order of 0.5 to 10 microns can hardly be effected.

With regard to the method in which the pore-forming agent is evaporated or extracted from the hardened resin containing the agent, a technique has been proposed for the production of a thin film having pores of pore sizes ranging between 1000 and 100 Å. This method, however, cannot be applied to the production of a product having a considerably large shape. In the method in which a resin in the form of O/W- or W/O-type emulsion is hardened followed by the evaporation of the dispersoid, it is not easy to control the size of the dispersoid, and many disconnected pores are inevitably formed. The control of the pore size on the order of 0.5 to 10 microns as a mean is also difficult in this method.

In order to obviate these problems of the known methods, Japanese Patent Publication No. 2464/1978 of the same applicant proposes a method of producing a porous material having open pores and a complicated shape, at a high precision and with a good control of the pore size. More specifically, this method comprises the steps of preparing an O/W type slurry as a mixture of a glycidyl-type epoxy resin, polymeric fatty acid polyamide hardener, filler and water, casting the slurry in a water-impermeable mold, hardening the water-containing slurry, and then dehydrating the hardened body. According to this method, it is possible to effect the control of the pore size by varying and adjusting factors such as the particle size of the filler, amount of the reactive diluent, mixing ratio of the epoxy resin, hardener, filler and water, and so on. Among these factors, the amount of the reactive diluent and the mixing ratio of the epoxy resin, hardener, filler and water are limited from the viewpoint of contraction during hardening and also in view of the strength of the hardened body. For this reason, it is not possible to control the pore size over a wide range. In order to control the pore size to obtain pores on the order of 0.5 to 10 microns, it is necessary to largely vary the particle size of the filler. The use of the filler having large particle size, however, reduces the strength of the hardened body undesirably. The reduction of strength can be avoided only through a reduction in the amount of water added, which in turn is accompanied by a new problem of an increase in the viscosity of the slurry. The increased particle size of the filler causes also another problem namely that the efficiency of the work is impaired due to sedimentation of the filler in the slurry which consists of water and the filler. When a filler having a mean size suitable for the work is used, the mean pore size in the product porous material is undesirably concentrated to an extremely small level of less than 1.5 microns. The porous material having such extremely small pore size can hardly be used for the aforementioned applications such as filtering medium, air diffusion method, casting mold and so forth and, hence, has only a small practical utility. Furthermore, this proposed method suffers from problems such as the impractically long time required for the slurry to flow into the mold and difficulty in forming a porous material having an intricate and complicated shape, due to the high viscosity of the slurry attributable to the use of a polymeric fatty acid polyamide solely as the hardener.

SUMMARY OF THE INVENTION

Under this circumstance, the present invention aims at providing a method of producing a porous material having open pores of a desired mean pore size (opening), thereby to obviate the problems of the prior art.

Namely, it is an object of the invention to provide a method of producing a porous material, which is improved to permit the control of the mean pore size over a wide range without requiring any change in the particle size of the filler.

Another object of the invention is to provide a method of producing a porous material, which is improved to permit the precise control of the mean pore size of the open pores within the range of between 0.5 and 10 microns, using a filler of such a small particle size as not to cause filler sedimentation which would impair the handling of the filler.

Still another object of the invention is to provide a method of producing a porous material in which the viscosity of the slurry is lowered to permit quick filling of the mold and high precision of the product even when the product has a complicated and intricate shape.

Other objects, features and advantages of the invention will become clear from the following description of the preferred embodiments of the invention.

These objects are achieved by using the following specific mixture amide compound as the hardener in the production of the porous material having open pores.

DESCRIPTION OF THE INVENTION INCLUDING THE PREFERRED EMBODIMENTS

In order to accomplish the above-described objects of the invention, the present invention proposes a method of producing a porous material comprising the steps of preparing a slurry by vigorously stirring a mixture comprising a bisphenol-type epoxy resin, a hardener, a filler and water, casting the slurry in a water-impermeable mold, hardening the slurry while it contains water, and dehydrating the hardened body, wherein the improvement comprises that the hardener is either (a) a mixture of (i) an amide compound which is obtained through a reaction between a monomeric fatty acid and an ethyleneamine expressed by the formula of $H_2N-(CH_2-CH_2-NH)_n-H$ where "n" is 3 to 5, and (ii) an amide compound of polymeric fatty acid (referred to as "polymeric fatty acid polyamide" in this specification) obtained through a reaction of a polymeric fatty acid and the ethyleneamine, or (b) a reaction mixture obtained by mixing reaction of the monomeric fatty acid, the polymeric acid and the ethyleneamine.

The monomeric fatty acid mentioned above is a fatty acid having a number of carbon atoms ranging between 10 and 22 per molecule. Preferably, the monomeric fatty acid used in the method of the invention is constituted mainly by an oleic acid, linoleic acid and/or erucic acid.

The ethyleneamine mentioned above is the one which is expressed by the following formula:

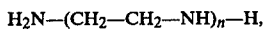

$H_2N-(CH_2-CH_2-NH)_n-H$, where n is 3 to 5, preferably 4 to 5.

The amide compound of the monomeric fatty acid and the polymeric fatty acid polyamide, as well as the reaction mixture, as mentioned above, are prepared by reacting the fatty acid(s) with the above ethylene amine in a ratio of about 0.8 to about 2.0 mol per one carboxyl group of fatty acid.

The weight ratio of the amide compound of monomeric fatty acid to the polymeric fatty acid polyamide in the mixture amide compound used as the hardener in the invention is not more than 90:10, preferably 90:10 to 5:95, and more preferably 80:20 to 20:80.

The filler used in the method of the invention is of a material which can be bound by means of a bisphenol-type epoxy resin. The material of the filler should have a small content of soluble salts, or otherwise a large contraction will occur during the hardening. The material should also be one which permits control of the particle size. Preferably, the filler is constituted by an inorganic material having a large surface energy such as powders of silica stone or silica sand.

As stated before, the known method proposed in Japanese Patent Publication No. 2464/1978 makes use of a polymeric fatty acid polyamide solely as the hardener. In contrast, in the present invention, the mixture amide compound as the hardener used in the method is either (a) a mixture of an amide compound produced through reaction between a monomeric fatty acid and ethyleneamine and a polymeric fatty acid polyamide or (b) reaction mixture produced through reaction of a monomeric fatty acid, polymeric fatty acid and ethyleneamine. In addition, the invention is characterized also in that the hardener contains a significant amount of amide compound of monomeric fatty acid.

The so-called polymeric fatty acid is produced from tallow oleic acid, tall oil fatty acid, soybean oil fatty acid and so forth, and is composed mainly of dimer acids, although trimmer acids and monomer acids are not excluded. The content of the monomer acid, however, is less than about 3% and the amide compound of monomeric fatty acid in the polymeric fatty acid polyamide thus produced is also less than about 3%. On the other hand, in the method of the invention, as stated before, the amount of the amide compound of monomeric fatty acid to be used is higher than that in the ordinary polymeric fatty acid.

The present inventors have found that the mean pore size in the product porous material is linearly increased while the viscosity of the slurry for the production of porous material having open pores is linearly decreased as the rate of amide compound of the monomeric fatty acid in the hardener is increased. With this knowledge, the inventors have accomplished the present invention through seeking for the optimum conditions such as the kind of the monomeric fatty acid, kind of the ethyleneamine, and the ratio between the fatty acid and ethyleneamine, in relation to the properties or characteristics in the production of the porous material and the properties of the hardened porous material.

The invention will become apparent from the following detailed description of the invention.

According to the invention, the amide compound of the monomeric fatty acid in the hardener produces the following effect.

The known method disclosed in Japanese Patent Publication No. 2464/1978 employs solely a polymeric fatty acid polyamide as the hardener. This polymeric fatty acid polyamide may be one such as obtained as a product of reaction between Versadime V216 (produced by Henkel Japan) and tetraethylene pentamine. As shown in Table 1, the porous material produced by this method showed a concentration of pore size to the smaller side and cannot have a mean pore size exceeding 1.5 microns, even when the particle size of the filler and the amount of addition and mixing of the reactive diluent are varied, insofar as the particle size of the filler is within a range easy to handle. Also, the viscosity of the slurry used in the production of the porous material showed extremely high viscosity.

TABLE 1

| | filler particle size | | | | | | | |
|---|---|---|---|---|---|---|---|---|
| | 5μ > 50% | | | | 5μ > 30% | | | |
| | epoxy resin | | | | | | | |
| | EP828 | | EP815 | | EP828 | | EP815 | |
| | reactive diluent | | | | | | | |
| | none | | about 10% | | none | | about 10% | |
| f | mean pore size (μ) | slurry viscosity (cps at 30° C.) | mean pore size (μ) | slurry viscosity (cps at 30° C.) | mean pore size (μ) | slurry viscosity (cps at 30° C.) | mean pore size (μ) | slurry viscosity (cps at 30° C.) |
| 1.2 | 0.7 | 73,000 | 1.0 | 46,000 | 1.1 | 55,000 | 1.3 | 60,000 |
| 1.5 | 0.6 | 55,000 | 0.9 | 40,000 | 1.0 | 38,000 | 1.3 | 39,000 |

Note
(i) EP828 and EP815 are bisphenol-type epoxy resin produced by Yuka Cell Epoxy Company.
(ii) "f" means the volume ratio of filler to sum of resins.
(iii) Water content is 41% in terms of volume ratio.
(iv) The reactive diluent is butylglycidylether.
(v) The mean pore size is shown in terms of the pore diameter of the pores at the portion of the 50% volume of the pore distribution as measured by a mercury press-feeding porosimeter with the porous material produced in accordance with the method as disclosed in Japanese Patent Publication No. 2464/1978.
(vi) The filler is produced by pulverizing a silica sand for glass produced in Seto district (manufactured by Nippo Keisa Kogyo K.K.) into a desired particle size.
(vii) The slurry viscosity was measured with the slurry prepared in accordance with the method of Japanese Patent Publication No. 2464/1978, using a B-type viscosimeter with No. 4 rotor at 6RPM.

In contrast to the above, in the method of the invention, an oleic acid (NNA 35 produced by Nippon Yushi K.K.) was used as the monomeric fatty acid, while the Versadime V216 (produced by Henkel Japan) was used as the polymeric fatty acid. At the same time, tetraethylenepentamine was used as the ethyleneamine. A porous material was produced in accordance with the method of the invention, using the reaction mixture of these three substances as the hardener. As will be seen from Table 2, the mean pore size is increased as the content of the amide compound of the monomeric fatty acid is increased, so that the mean pore size is controllable within the range of between 1 and 8 microns even when the kinds and the contents of the materials other than the hardener are unchanged. From Table 2, it will be seen also that the viscosity of the slurry becomes lower as the content of the amide compound of monomeric fatty acid is increased.

TABLE 2

| ratio of monomeric fatty acid amide | f | W (%) | filler particle size | mean pore diameter (μ) | contraction rate (%) | slurry viscosity (cps at 30° C.) |
|---|---|---|---|---|---|---|
| 0 | 1.2 | 41 | 5μ > 30% | 1.3 | 0.11 | 49,000 |
| 5 | " | " | " | 1.4 | 0.11 | 42,000 |
| 20 | " | " | " | 1.6 | 0.13 | 32,000 |
| 34 | " | " | " | 1.9 | 0.16 | 25,000 |
| 50 | " | " | " | 2.0 | 0.13 | 21,000 |
| 60 | " | " | " | 2.2 | 0.20 | 16,500 |

TABLE 2-continued

| ratio of monomeric fatty acid amide | f | W (%) | filler particle size | mean pore diameter (μ) | contraction rate (%) | slurry viscosity (cps at 30° C.) |
|---|---|---|---|---|---|---|
| 66 | " | " | " | 3.9 | 0.22 | 15,500 |
| 70 | " | " | " | 5.3 | 0.30 | 15,000 |
| 75 | " | " | " | 8.0 | 0.55 | 15,000 |

Note
(i) The mixing ratio or content of the monomeric fatty acid amide is determined as follows. Tetraethylenepentamine is added to the mixture of monomeric fatty acid and polymeric fatty acid at a ratio of 1 mol for one carboxyl group existing in the mixture. The mixture with the addition of tetraethylenepentamine is heated up to 230° C. over 2 hours in $N_2$ atmosphere and then maintained at 230 to 240° C. for 2 hours to become the hardener. The mixing ratio of the monomeric fatty acid amide is the ratio of amount of the initial monomeric fatty acid before the mixing to the sum of the amounts of this monomeric fatty acid and the polymeric fatty acid.
(ii) "f" is the volume ratio of the filler to the sum of resins.
(iii) "W" is the volume ratio of water to the whole of the prepared material.
(iv) The mean pore size is the mean diameter of pores in the porous material produced by the method of the invention.
(v) The contraction rate is expressed as the contraction rate in the heightwise direction of a hardened body and is measured as follows. A slurry is cast in an FRP case having a size of 50 (length) × 50 (width) × 500 (height) mm and is cured for 24 hours in a room of an air temperature controlled at 45° C. under a drying prevention (the case is sealed). After the hardening, the porous material is taken out of the case, and the heightwise linear contraction rate is measured from the contraction marks formed at 450 mm interval in the FRP case and the marks left on the hardened porous material.
(vi) Silica sand for glass produced in Seto district (manufactured by Nippo Keisa Kogyo K.K.) pulverized into size of 5 microns > 30% was used as the filler material.
(vii) EP815 produced by Yuka Cell Epoxy Company was used as the bisphenol-type epoxy resin.
(viii) The slurry viscosity is the viscosity of the slurry prepared in accordance with the invention, as measured by a B-type viscometer.

It may appear that the change of the mean pore size from the order as shown in Table 1 to that shown in Table 2 is only minor and, hence, no substantial effect is produced by such a change. As a matter of fact, however, this small change in the pore size offers a great advantage as explained hereinbelow.

Attention must be drawn to the following formula which is known as Poiseuille's equation.

$$Q = \frac{\pi r^4}{8\eta} \cdot \frac{h}{l}$$

where, Q represents the amount of transmission through pore per unit time, "r" represents a pore diameter, "$\eta$" represents the viscosity of fluid, "h" represents the pressure difference, and "l" represents the pore length. As will be understood from this formula, the velocity of a fluid flowing through the pore is proportional to the fourth power of the pore diameter. Thus, a remarkable practical advantage is produced even by a small change or adjustment of the above mean pore size.

Porous materials were produced in accordance with the method of the invention, using pentaethylenehexamine as the ethyleneamine, with various hardener compositions without changing the kinds and amounts of the materials other than the hardener. Table 3 shows the mean pore sizes and contraction rates as measured with these porous materials. From this Table, it will be understood that the mean pore size is increased, while the viscosity of the slurry is decreased, as the content of the amide compound of monomeric fatty acid is increased.

TABLE 3

| ratio between monomeric acid amide and polymeric acid polyamide | f | W (%) | filler particle size | mean pore size (μ) mixed after independent reactions | reaction mixture | contraction rate (%) mixed after independent reactions | reaction mixture | slurry viscosity (cps at 30° C.) mixed after independent reactions | reaction mixture |
|---|---|---|---|---|---|---|---|---|---|
| 33:67 | 1.2 | 41 | 5μ > 30% | 1.34 | | 0.10 | | 24,000 | |
| 50:50 | " | " | " | 1.48 | | 0.11 | | 20,000 | |
| 60:40 | " | " | " | | 2.2 | | 0.07 | | 19,000 |
| 67:33 | " | " | " | 1.43 | 2.0 | 0.07 | 0.05 | 17,500 | 18,500 |
| 75:25 | " | " | " | 1.45 | 3.3 | 0.22 | 0.08 | 17,000 | 14,500 |
| 80:20 | " | " | " | 1.51 | 4.4 | 0.11 | 0.10 | 20,000 | 18,500 |
| 90:10 | " | " | " | 3.68 | — | 0.33 | | 20,500 | — |

(Note)
(i) The ratio between the monomeric fatty acid amide and the polymeric fatty acid polyamide is determined as follows. In the case of the mixture obtained after independent reactions, the hardener is prepared by a process comprising the steps of: (a) adding 1 mol of pentaethylenehexamine to 1 mol of the monomeric fatty acid to conduct a synthesis under the following condition to form an amide compound of monomeric fatty acid, and (b) mixing a polymeric fatty acid and pentaethylene-hexamine which is added at a ratio of 1 mol for 1 (one) carboxylic group existing in the polymeric fatty acid to effect a synthesis under the following condition to form a polymeric fatty acid polyamide, and (c) mixing the thus formed amide compound of monomeric fatty acid (a) and polymeric fatty acid polyamide (b) at ratios shown in Table 3. The ratio between the amount of the initial amide compound of monomeric fatty acid and the amount of the initial polymeric fatty acid polyamide before they are mixed is determined as the ratio between monomeric fatty acid amide and the polymeric fatty acid polyamide in the hardener. It should be noted that the amide compound of monomeric fatty acid which may exist in the polymeric fatty acid polyamide is excluded from the abovementioned initial amide compound of monomeric fatty acid. In the case where the reaction mixture is used as the hardener, the monomeric fatty acid and the polymeric fatty acid are mixed at the ratios shown in Table 3. After adding pentaethylenehexamine to this mixture at a ratio of 1 mol for 1 (one) carboxylic group in the mixture, the mixture is heated up to 230° C. over 2 hours and then is maintained at 230 to 240° C. for 2 hours in $N_2$ gas atmosphere to cause a reaction thereby to synthesize the hardener. In this case, the ratio between the monomeric fatty acid and the polymeric fatty acid before the mixing is determined as the ratio between monomeric fatty acid amide and polymeric fatty acid polyamide in the hardener.
(ii) "f" represents the volume ratio of filler to the sum of resins.
(iii) "W" represents the volume % of water in the prepared material.
(iv) The mean pore size shows the mean diameter of pores in the porous material produced by the method of the invention.
(v) The contraction rate is the rate of contraction in the heightwise direction of a hardened body and is measured as follows. A slurry is cast in an FRP case having a size of 50 (length) × 50 (width) × 500 (height) mm and is cured for 24 hours in a room of an air temperature controlled at 45° C. under a drying prevention (the case is sealed). After the hardening, the porous material is taken out of the case, and the heightwise linear contraction rate is measured from the contraction marks formed at 450 mm interval in the FRP case and the marks left on the hardened porous material.
(vi) An oleic acid (NNA35 manufactured by Nippon Yushi K.K.) is used as the monomeric fatty acid.
(vii) Versadime V216 produced by Henkel Japan is used as the polymeric fatty acid.
(viii) Pulverized silica sand for glass produced in Seto district (manufactured by Nippo Keisa Kogyo K.K.) is used as the filler.
(ix) EP815 manufactured by Yuka Cell Epoxy Company is used as the bisphenol-type epoxy resin.
(x) The slurry viscosity is the viscosity of the slurry prepared in accordance with the method of the invention, as measured by a B-type viscometer.

As stated before, the monomeric fatty acid as used in the method of the invention can include 10 to 22 carbon atoms per molecule. Fatty acids having carbon atom numbers exceeding 22 cannot be used adequately because of too high melting point, while the fatty acids having carbon atom numbers less than 10 cause a problem that the amide compound produced through reaction with the ethyleneamine shows only a small surfactant effect so that the slurry is made unstable to allow a large contraction during the hardening.

Generally, fatty acids produced from animal and vegetable oils and fats are constituted by a mixture of mainly lauric acid, myristic acid, palmitic acid, stearic acid, oleic acid and/or linolic acid, as well as other fatty acids having carbon atom numbers ranging between 10 and 22. These mixed fatty acids from natural materials can be used for the monomeric fatty acid in this invention. Among the mixed fatty acids, those containing oleic acid, linolic acid and/or erucic acid as the major constituent are preferable from the viewpoints of the properties of the hardener obtained and the contraction during the hardening.

Table 4 shows the viscosities at 28° C. of hardeners which were prepared by mixing various monomeric fatty acids with the polymeric fatty acid at mol. ratio of 50:50, adding thereto tetraethylenepentamine (TPA) of a ratio of 1 mol for one carboxyl group existing in the mixed fatty acids, heating the mixture up to 230° C. over 2 hours and then maintaining the same at 230° to 240° C. for an additional 2 hours to obtain the hardener. The table also shows the ratio of contraction during the hardening in the case where the porous material was produced by using the above hardeners.

TABLE 4

| kind of monomeric fatty acid | Viscosity of hardener (cps at 25° C.) | f | W | Filler particle size | Contraction during hardening (%) |
|---|---|---|---|---|---|
| oleic acid | 3500 | 1.2 | 41 | 5μ > 30% | 0.13 |
| linoleic acid | 3000 | " | " | " | 0.15 |
| stearic acid | gel | " | " | " | 0.17 |
| palmitic acid | gel | " | " | " | 0.49 |
| myristic acid | gel | " | " | " | 0.31 |

TABLE 4-continued

| kind of monomeric fatty acid | Viscosity of hardener (cps at 25° C.) | f | W | Filler particle size | Contraction during hardening (%) |
|---|---|---|---|---|---|
| lauric acid | 5500 | " | " | " | 0.67 |

Note
(i) The monomeric fatty acids other than oleic acid are reagents produced by Tokyo Kasei K.K.
(ii) Oleic acid is NNA35 manufactured by Nippon Yushi K.K.
(iii) Versadime V216 produced by Henkel Japan is used as the polymeric fatty acid.
(iv) "f" represents the volume ratio of filler to the sum of resins.
(v) "W" represents the volume % of water in the prepared material.
(vi) Pulverized silica sand for glass produced in Seto district (manufactured by Nippo Keisa Kogyo K.K.) is used as the filler.
(vii) EP815 manufactured by Yuka Cell Epoxy Company is used as the bisphenol-type epoxy resin.
(viii) The contraction rate is the rate of contraction in the heightwise direction of a hardened body and is measured as follows. A slurry is cast in an FRP case having a size of 50 (length) × 50 (width) × 500 (height) mm and is cured for 24 hours in a room of an air temperature controlled at 45° C. under a drying prevention (the case is sealed). After the hardening, the porous material is taken out of the case, and the heightwise linear contraction rate is measured from the contraction marks formed at 450 mm interval in FRP case and the marks left on the hardened porous material.

In the ethyleneamine $H_2N-(CH_2CH_2-NH)_nH$ as used, the number "n" is selected to be 3 to 5 for the following reason. Namely, a slurry comprising the hardener prepared from the ethylenediamine or diethylenetriamine having the number "n" of 1 or 2 exhibits a high cohesion force, as well as a large contraction, and, therefore, the hardener cannot be used practically in the production of the porous material. Triethylenetetramine having the number "n" of 3 also tends to exhibit a somewhat large cohesion and contraction. For these reasons, it is preferred to use tetraethylenepentamine and pentaethylenehexamine having the numbers "n" of 4 and 5, respectively.

As a matter of fact, however, it is difficult to commercially obtain a pure ethyleneamine having a single composition. The ethyleneamine as used in the invention, therefore, may be such a mixture as the commercially available goods.

In the method of the invention, the ratio between the amide compound of monomeric fatty acid and the polymeric fatty acid polyamide in the hardener is selected preferably to range between 90:10 and 5:95 by weight. As will be seen from Tables 2 and 3, as the content of the amide compound of the monomeric fatty acid is increased, the rate of hardening contraction is increased to impair the production of porous material at high dimensional precision. For this reason, the content of the amide compound of monomeric fatty acid should be selected not to exceed 90%. This content is preferably up to 80%, when the product has a large size and complicated shape.

On the other hand, when it is desired to produce a porous material having open pores of a pore diameter of about 0.5 micron, the content of the amide compound of the monomeric fatty acid may be smaller than 5%. However, the production of the porous material having mean pore size not smaller than 1.5 micron encounters a difficulty when the above-mentioned content is smaller than 5%. For this reason, the preferred lower limit of the content of amide compound of monomeric fatty acid is selected to be 5%.

In the method of the invention, the amide compound of monomeric fatty acid and the polymeric fatty acid polyamide are synthesized with the addition of ethyleneamine at a ratio of about 0.8 to about 2.0 mols per 1 (one) carboxyl group. When the ethyleneamine is increased beyond 1.0 mol, the slurry tends to make a cohesion contraction during hardening, as a result of the presence of free or separated ethyleneamine. On the other hand, when the ethyleneamine is decreased below 1.0 mol, the $NH_2$ radicals at both ends of the ethyleneamine react with COOH. The slurry comprising the hardener obtained showed an increased tendency of cohesion contraction at the time of hardening. The ethyleneamine content ranging between about 0.8 and about 2.0 moles per 1 (one) carboxyl group, however, can produce a generally acceptable result.

A reactive diluent such as butyl glycidyl ether, allyl glycidyl ether, phenyl glycidyl ether, tertiary carboxylic acid glycidyl ester, secondary pentyl phenol monoglycidyl ether or the like may be added to the bisphenol-type epoxy resin. As a result of addition of such a diluent, the slurry viscosity is decreased and the pore size in the porous product is increased. A too large amount of addition of such a diluent, however, undesirably causes a contraction during the hardening. The limits of amount of addition of the reactive diluent depends on the kind of the diluent. It is preferred to use the diluent of not more than 25 parts by weight for 100 parts by weight of the bisphenol-type epoxy resin.

In the method of the invention, it is preferable to add a hardening promotion agent, in order to increase the rate of hardening and, hence, to enhance the strength of the hardened body. Usually, substances such as phenol, triethanolamine, hexamethylenetetramine, benzyldimethylamine, trisdimethylaminomethylphenol or the like are usable as the hardening promotion agent in combination with a polyamide hardener. In the method of the invention, a superior effect is obtained particularly by the use of a hardening promotion agent of a tertiary amine of aromatic group such as benzyldimethylamine, trisdimethylaminomethylphenol and so forth. From the viewpoint of the strength of the hardened body, it is preferred to use a hardening promotor in about 7 to 15 parts by weight for 100 parts by weight of the hardener.

An example of the method of the invention is shown below only for the illustrating purpose.

EXAMPLE 796 g of a polymeric fatty acid (Versadime V216, produced by Henkel Japan), 1591 g of oleic acid (NNA 35 produced by Nippon Yushi K.K.) and 1613 g of tetraethylenepentamine (produced by Seitetsu Kagaku K.K.) were put together in a stainless steel reaction vessel having a volume of 5 l. The mixture was heated from the normal temperature up to 230° C. in 2 hours while continuing stirring under a supply of $N_2$ gas and then held at 230° to 240° C. for 2 hours to synthesize 3790 g of hardener.

Then, 647.9 g of bisphenol-type epoxy resin (EP815 produced by Yuka Epoxy K.K.), 218.2 g of the above-mentioned hardener, 17.7 g of a hardening promotion agent TAP (made by Kayaku Noulli K.K.), 2803 g of silica sand powder of particle size of 5 microns>30% and 1348 g of water were put in a stainless steel vessel having no lid. These materials were vigorously stirred for 10 minutes to make a slurry.

This slurry was cast in an FRP case having a size of 50 (length)×50 (width)×500 (height) mm and was cured for 24 hours in a room of an air temperature controlled at 45° C. under a drying prevention (the case was sealed). After the hardening, the porous material was taken out of the case, and the heightwise linear contraction rate was measured from the contraction marks formed at 450 mm interval in the FRP case and the marks left on the hardened porous material. The contraction rate thus measured was 0.18%. This hardened porous material was then dried and the pore size distribution was measured by means of a mercury press-feeding type porosimeter. This hardened porous material showed a mean pore size of 4.0 microns.

Test pieces for measurement of bending strength were molded from this slurry. The bending strength in wet condition was measured after a drying-prevention hardening of the cast slurry at 45° C. for 24 hours. The mean bending strength was 70 Kg/cm$^2$. The dried test pieces after measurement of the wet bending strength showed an apparent porosity of 41%.

What is claimed is:

1. A method of producing a porous material having open pores, comprising the steps of preparing a slurry from a mixture comprising a bisphenol-type epoxy resin, a hardener, a filler and water, casting said slurry in a water-impermeable mold, hardening said slurry while it contains the water and dehydrating the hardened body, wherein the improvement comprises that said hardener is either (a) a mixture of (i) an amide compound which is obtained through a reaction between a monomeric fatty acid and an ethyleneamine expressed by the formula of $H_2N-(CH_2-CH_2-NH-)_n-H$ where "n" be 3 to 5, and (ii) a polymeric fatty acid polyamide obtained through a reaction of a polymeric fatty acid and said ethyleneamine, or (b) a reaction mixture obtained by mixing reaction of said monomeric fatty acid, said polymeric fatty acid and said ethyleneamine.

2. A method of producing a porous material according to claim 1, wherein said monomeric fatty acid has 10 to 22 carbon atoms per molecule.

3. A method of producing a porous material according to claim 1, wherein said monomeric fatty acid is constituted mainly by oleic acid, linoleic acid and/or erucic acid.

4. A method of producing a porous material according to claim 1, wherein said ethyleneamine is constituted mainly by tetraethylenepentamine and/or pentaethylenehexamine.

5. A method of producing a porous material according to claim 1, wherein said amide compound of said monomeric fatty acid, said polymeric fatty acid polyamide and said reaction mixture are formed by reactions which are conducted by adding about 0.8 to about 2.0 mols of ethyleneamine for 1 (one) carboxylic group in said fatty acids.

6. A method of producing a porous material according to claim 1, wherein the ratio between said amide compound of said monomeric fatty acid and said polymeric fatty acid polyamide ranges between 90:10 and 5:95 by weight.

7. A method of producing a porous material according to claim 1, wherein said mixture for producing a slurry further contains a reactive diluent and/or a hardening promotion agent.

8. A method of producing a porous material according to claim 7, wherein said hardening promotion agent is selected from tertiary amines of the aromatic group such as benzyldimethylamine and trisdimethylaminomethylphenol.

* * * * *